United States Patent
Kors et al.

(10) Patent No.: US 9,869,576 B2
(45) Date of Patent: Jan. 16, 2018

(54) OPTICAL LIQUID LEVEL DETECTION SENSOR AND LIQUID OVERFILL PREVENTION SYSTEM COMPRISING SUCH SENSOR

(71) Applicant: OPW Fluid Transfer Group Europe B.V., Nieuw-Vennep (NL)

(72) Inventors: Leonardus Alexius Kors, Nieuw-Vennep (NL); Arie Pieter Wilhelmus Van Der Maarl, Nieuw-Vennep (NL); Jan Cornelis De Boer, Nieuw-Vennep (NL)

(73) Assignee: OPW FLUID TRANSFER GROUP EUROPE B.V., Nieuw-Vennep (NL)

( * ) Notice: Subject to any disclaimer, the term of this patent is extended or adjusted under 35 U.S.C. 154(b) by 0 days.

(21) Appl. No.: 14/764,201

(22) PCT Filed: Jan. 30, 2014

(86) PCT No.: PCT/NL2014/050049
§ 371 (c)(1),
(2) Date: Jul. 29, 2015

(87) PCT Pub. No.: WO2014/120005
PCT Pub. Date: Aug. 7, 2014

(65) Prior Publication Data
US 2015/0362355 A1 Dec. 17, 2015

(30) Foreign Application Priority Data
Jan. 30, 2013 (NL) ........................................ 2010203

(51) Int. Cl.
*G01N 15/06* (2006.01)
*G01F 23/292* (2006.01)
*F17C 13/02* (2006.01)

(52) U.S. Cl.
CPC .......... *G01F 23/292* (2013.01); *F17C 13/021* (2013.01); *G01F 23/2925* (2013.01); *G01F 23/2927* (2013.01)

(58) Field of Classification Search
CPC ............... G01F 23/292; G01F 23/2925; G01F 23/2927; G01F 23/2922
(Continued)

(56) References Cited

U.S. PATENT DOCUMENTS 3,683,196 A * 8/1972 Obenhaus ........... G01F 23/2927
250/227.11
4,286,464 A * 9/1981 Tauber ................ G01F 23/2924
340/619
(Continued)

FOREIGN PATENT DOCUMENTS

EP 0447728 A2 9/1991
WO 2008/076720 A2 6/2008

*Primary Examiner* — Thanh Luu
(74) *Attorney, Agent, or Firm* — Hoffmann & Baron, LLP

(57) ABSTRACT

An optical liquid level detection sensor includes a light source for emitting a light beam, a liquid contact surface, and a light detector, where the light source is arranged to emit a light beam towards the liquid contact surface, which liquid contact surface reflects or transmits the light beam in dependence of liquid being present on the liquid contact surface, where the light detector is arranged to receive the light beam after reflection on the liquid contact surface, where the sensor includes an at least partially transparent ring element, and where the liquid contact surface is formed by an outer surface of the ring element.

15 Claims, 4 Drawing Sheets

(58) Field of Classification Search
USPC .......................................... 250/577; 73/293
See application file for complete search history.

(56) References Cited

U.S. PATENT DOCUMENTS

| | | | | |
|---|---|---|---|---|
| 4,410,886 A | * | 10/1983 | Motsinger | G01F 23/0069 250/577 |
| 4,857,894 A | * | 8/1989 | Dahl | G08B 21/182 250/577 |
| 4,906,845 A | * | 3/1990 | Bellhouse | G01F 23/2921 250/227.28 |
| 5,175,780 A | * | 12/1992 | Sano | G02B 6/3514 250/227.22 |
| 2007/0144564 A1 | | 6/2007 | Gadini et al. | |

* cited by examiner

OPTICAL LIQUID LEVEL DETECTION SENSOR AND LIQUID OVERFILL PREVENTION SYSTEM COMPRISING SUCH SENSOR

CROSS-REFERENCE TO RELATED APPLICATIONS

This application is the National Stage of International Application No. PCT/NL2014/050049 filed Jan. 30, 2014, which claims the benefit of Netherlands Application No. 2010203, filed Jan. 30, 2013, the contents of which is incorporated by reference herein.

FIELD OF THE INVENTION

The present invention relates to an optical liquid level detection sensor, in particular for flammable liquids such as liquid fuels, and to a liquid overfill prevention system comprising such sensor. Optical liquid level detection sensors are configured to determine, using a light beam, whether liquid is present on a liquid contact surface of the sensor. Such sensors are known to be used in a liquid overfill prevention system. A liquid overfill prevention system is configured to monitor whether a compartment of a truck or another liquid container will not be overfilled.

BACKGROUND OF THE INVENTION

WO 2008/076720 discloses an optical level detection sensor for a liquid overfill prevention system to be used in an overfill prevention system for liquid fuels.

This known optical liquid level detection sensor comprises a light source for emitting a light beam, a cone shaped transparent prism element forming liquid contact surface, and a light detector. The light source and the light detector are arranged in a longitudinal housing. The light source is arranged to emit a light beam towards the liquid contact surface, which liquid contact surface reflects or transmits the light beam in dependence of liquid being present on the liquid contact surface. The light detector is arranged to receive the light beam after reflection on the liquid contact surface. When the light beam is transmitted through the liquid contact surface due to the presence of liquid on this contact surface, the light beam will no longer reach the light detector. As a result, the presence of liquid on the liquid contact surface may be determined in dependence of the amount of light received by the light detector.

In the construction of the level sensor of WO 2008/076720, the prism is press-fitted into a metal retention ring and the metal retention ring is press-fitted into the probe body to obtain a sealing engagement between the prism and the probe body.

A drawback of such construction is that the press-fitted connection between the metal retention ring and the prism and between the metal retention ring and the probe body is relatively difficult to assemble. As a result, there is a risk that the sensor is not properly sealed, and that liquid can enter the interior of the sensor.

A further drawback of this construction is that the press-fitted connection cannot be taken apart without damage to the prism, metal retention ring and/or probe body.

SUMMARY OF THE INVENTION

It is an object of the invention to provide an improved optical level detection sensor lacking one or more of the above-mentioned drawbacks, or at least to provide an alternative level detection sensor.

The invention provides an optical liquid level detection sensor, in particular for use in a liquid overfill prevention system for liquid fuels, the sensor comprising:
  a light source for emitting a light beam,
  a liquid contact surface, and
  a light detector,
  wherein the light source is arranged to emit a light beam towards the liquid contact surface, which liquid contact surface reflects or transmits the light beam in dependence of liquid being present on the liquid contact surface, and
  wherein the light detector is arranged to receive the light beam after reflection on the liquid contact surface,
  characterized in that, the sensor comprises an at least partially transparent ring element, wherein the liquid contact surface is formed by an outer surface of the ring element.

By providing a sensor comprising an at least partially transparent ring element, wherein the liquid contact surface is formed by an outer surface of the ring element, the ring element of the sensor can be easily and reliably placed in a sealing engagement with other parts of the sensor. In particular, the ring element may have planar sealing surfaces at opposed sides of the ring element. These sealing surfaces are very suitable to create a sealing engagement between the ring element and other parts of the sensor.

It is remarked that the ring element as described in this patent application may have any suitable circumference, and is not necessarily circular.

In an embodiment, the light source and/or light detector are arranged in the inner space of the ring element. The ring element defines an inner space. By arranging the light source and/or light detector in this inner space a compact construction is obtained. The ring element may comprise one or more inner spaces running through the ring element. The one or more inner spaces may be used to make a connection possible between two parts at opposite sides of the ring element to pull the two parts towards each other to create a sealing engagement between the ring element and each of the two parts.

Furthermore, no reflective elements are required, since the light source and/or light detector can be arranged directly next to the ring element in a proper position to emit light to the liquid contact surface and/or receive light from the liquid contact surface.

In an alternative embodiment, reflective elements may be arranged in the inner space to deflect a light beam from the light source to the liquid contact surface and the reflected light beam from the outer surface towards the light detector.

In an embodiment, at least a part of the ring element forming the liquid contact surface is formed as a prism element. The ring element preferably comprises a prism element which forms the liquid contact surface. The prism shape may for example be formed during moulding of the ring element or machined, or example by cutting, in particular laser cutting, the ring element out of a plate of base material.

In an embodiment, the prism element has curved surfaces, in particular convex surfaces, to focus light coming from the light source to the light detector. By providing the prism element with curved surfaces, in particular convex surfaces, a diverging light beam coming from the light source can be converged again so that a substantial larger part of a reflected light beam is captured by the light detector compared to a reflected light beam on straight prism surfaces.

It is remarked that the use of curved surfaces, in particular convex surfaces, of a prism element forming a liquid contact surface of a liquid level detection sensor to focus light towards the light detector, may also advantageously be applied in prism elements other than a prism element formed in a ring element, for instance a prism element as disclosed in WO 2008/076720.

The ring element may be produced from a single transparent material, such as allyl diglycol carbonate (ADC), a transparent plastics material. The ring element may also be made out of any other suitable material, in particular glass or plastics material transparent for the light beam of the light source.

At least the part of the ring element forming the liquid contact surface should be transparent for the light beam of the light source so that the light beam can travel from the inner side of the sensor through the transparent material of the ring element to the liquid contact surface, where it is transmitted or reflected in dependence of the presence of liquid on the liquid contact surface.

In an embodiment, the ring element is completely transparent.

In an embodiment, the sensor comprises a housing having two or more housing parts, wherein sealing elements are arranged between sealing surfaces of the ring element and the two or more housing parts, wherein the sealing surfaces of the ring elements are formed by opposed planar surfaces of the ring element. The ring element provides planar surfaces suitable to create a sealing connection between opposite sides of the ring elements and respective housing parts of the housing. Sealing elements may be arranged between the ring element and the housing parts, for example ring shaped sealing element such as flexible sealing rings.

The sealing elements may be separate parts or may be integral or fixed to the ring element or housing part. The housing part and/or planar surface may be provided with a groove or recess or extensions forming a groove or recess to partially receive the sealing element.

In an embodiment, the light source and/or light detector are arranged at a fixed location on a printed circuit board, wherein the printed circuit board is mounted in a fixed position with respect to the ring element. As a result of this construction, the light source and the light detector are mounted in a fixed position with respect to the ring element, and the liquid contact surface, for example a prism element, is optimally aligned with the light source and the light detector.

It is remarked that the arrangement of the light source and/or light detector at a fixed location on a printed circuit board means that the light source and/or light detector after being mounted on the printed circuit board, for example by soldering, are substantially immobilized on the printed circuit board. Advantageously, the light source and/or the light detector are surface mounted devices (SMD) which are preferably mounted on the printed circuit board by a SMD pick-and-place machine.

After fixation, the components, such as light source and/or light detector are no longer movable with respect to the printed circuit board, and no separate fixation device is required, such as the front spacer of the sensor of WO 2008/076720.

It is remarked that advantageously all electronic components, such as processing components, are surface mounted devices, which are preferably mounted on the printed circuit board by a SMD pick-and-place machine.

In an embodiment, the sensor comprises a printed circuit board supporting one or more electronic components including the light source and the light detector, an electrically conductive housing part and a connection element to connect the printed circuit board to the housing part, wherein the connection element is a galvanic connection configured to provide a ground connection between the printed circuit board and the housing part.

A printed circuit board of the sensor normally has a standard ground connection which is connected by a ground cable to earth. By using a galvanic connection to connect the printed circuit board to the housing part an additional ground connection can be provided next to the standard ground connection. This additional ground connection is led through the housing part to the outside of the sensor and can for example be connected to a general ground system of a truck on which the sensor is mounted.

Such additional ground system has the advantage that when the ground cable of the standard ground connection no longer provides a ground connection, for example when the cable is disconnected from an associated connector, the sensor is still connected to earth via the additional ground connection.

It is remarked that this additional ground connection can advantageously be used in other liquid level detection sensors not comprising an at least partially transparent ring element, wherein the liquid contact surface is formed by an outer surface of the ring element.

In an embodiment, the sensor comprises processing components to control the light source and the light detector, and to provide a signal representative for the presence of liquid on the liquid contact surface.

In an embodiment, the sensor comprises two or more ring elements spaced with respect to each other, wherein the two or more ring elements each form a liquid contact surface associated with a light source and a light detector. The use of ring elements to form liquid contact surfaces has the further advantage that the liquid contact surface is arranged at the side of the sensor, while a printed circuit board can pass through the inner of the ring element. This makes it possible to arrange in a single sensor multiple ring elements spaced with respect to each other, wherein the two or more ring elements each form a liquid contact surface associated with a light source and a light detector.

When such sensor with multiple ring elements is arranged in a liquid compartment, for instance a liquid compartment of a truck, with the ring elements spaced in the vertical direction, the liquid level within the compartments can be monitored at different heights. Such arrangement can for example be used when filling to different heights is desirable. It is also possible to use the multiple ring elements for more controlled filling of the compartment. For example, when it is desired to fill a compartment up to an upper ring element, a fast filling mode having a high filling rate may be used to fill up the compartment up to a lower ring element. Thereafter the filling mode may be changed to a slower filling mode having a low filling rate, which is lower than the high filling rate, to fill the compartment in a more controlled manner from the lower ring element up to the upper ring element.

In an embodiment, the sensor comprises one or more further light sources for emitting light signals representative for a status of the sensor. The light signals may for example comprise light signals with one or more colors and/or light signals emitted during a predetermined time or time interval.

The one or more further light sources may be a RGB LED and may be mounted on a printed circuit board, preferably as a surface mounted device. The use of further light signals may be useful for indication of the status of the sensor. These light signals may for example be representative for a measurement result, such as liquid/no liquid on the liquid contact surface, an error status, a data transmission status, an initialization status, etc, wherein each status is associated with a certain colour and an emitting interval or period.

It is remarked that the use of one or more further light sources can advantageously also be applied in other liquid level detection sensors not comprising an at least partially transparent ring element, wherein the liquid contact surface is formed by an outer surface of the ring element.

The sensor of the invention is advantageously used in a liquid overfill prevention system comprising one or more liquid level detection sensors according to the invention. The liquid overfill prevention system is in particular suitable for the transport of dangerous liquids, in particular flammable liquids, such as liquid fuels. Such overfill prevention system for liquid fuels is usually subject to stringent requirements as described in NEN EN 13922.

The liquid level detection sensors may be arranged in an upper part of the interior of a compartment of a truck, for example to detect whether the compartment is filled to a predetermined level. The liquid level detection sensors may also be arranged in a lower part of the interior of the compartment, for example to detect whether the compartment is sufficiently empty, e.g. not filled at a level above the location of the level detection sensor so that a desired quantity of liquid can be introduced into the compartment without overfilling the compartment.

BRIEF DESCRIPTION OF THE DRAWINGS

An embodiment of the invention will now be explained, by way of example only, whereby reference will be made to the accompanying drawings, in which.

DETAILED DESCRIPTION OF THE INVENTION

Figure 1:
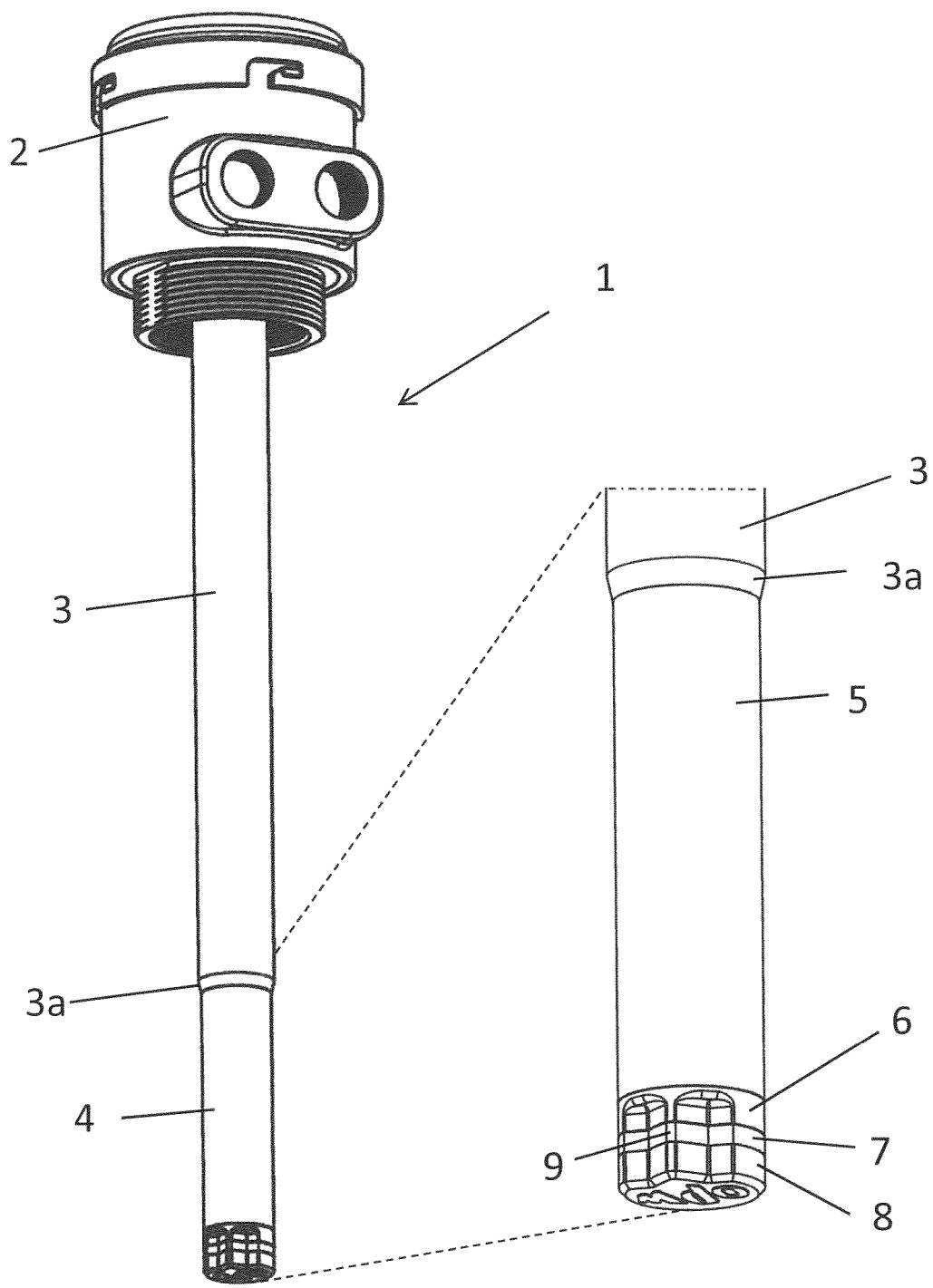
FIG. 1 shows a perspective view on an embodiment of a liquid level detection sensor according to the invention.

FIG. 1 shows a perspective view of an optical liquid level detection sensor unit according to the invention, generally indicated by reference numeral 1. The sensor unit 1 comprises a sensor mounting device 2, a sensor support tube 3 and a sensor device 4. The sensor device 4 is shown enlarged at the right side of FIG. 1.

The sensor mounting device 2 may be of a standard type to mount the sensor unit 1 in an opening at the top side of a compartment of a truck. The sensor device 4 is connected to the sensor support tube 3, for example by a screw connection. The sensor device 4 may be connected to other devices, such as a monitoring system, by a number of sensor cables running through the sensor support tube 3.

The sensor unit 1 is configured as a part of a liquid overfill prevention system configured to avoid that a compartment is overfilled with liquid, in particular dangerous goods, such as flammable liquids, in particular liquid fuels.

Typical requirements for overfill prevention systems for liquid fuels can for example be found in NEN EN 13922. These typical requirements and the characteristics of flammable liquids, in particular liquid fuels in general, require a specific design of the sensor to be used in such over prevention system.

The sensor device 4 is, after mounting of the sensor unit 1 in the opening of the compartment in an upper area of the interior of the compartment to determine whether the liquid level in the compartment has reached the sensor device 4.

The sensor device 4 comprises in longitudinal direction a cylindrical housing part 5, a connector ring 6, a transparent ring element 7 and a housing end part 8. The transparent ring element 7 comprises a prism element 9 which having outer surfaces forming a liquid contact surface. The sensor device 4 is configured to detect whether liquid is present on the liquid contact surface.

The sensor device has generally a cylindrical shape with a diameter smaller than the diameter of the sensor support tube 3. As a consequence, the sensor device 4 can be introduced more easily through the opening of the compartment without touching the walls of the opening. This has the advantage that any lubricant on the walls of the opening does not contaminate the sensor device, in particular the prism element 9 of the ring element 7. The sensor support tube 3 comprises a tapered end part 3a to provide a smooth transition between the sensor support tube 3 and the sensor device 4.

Figure 2:
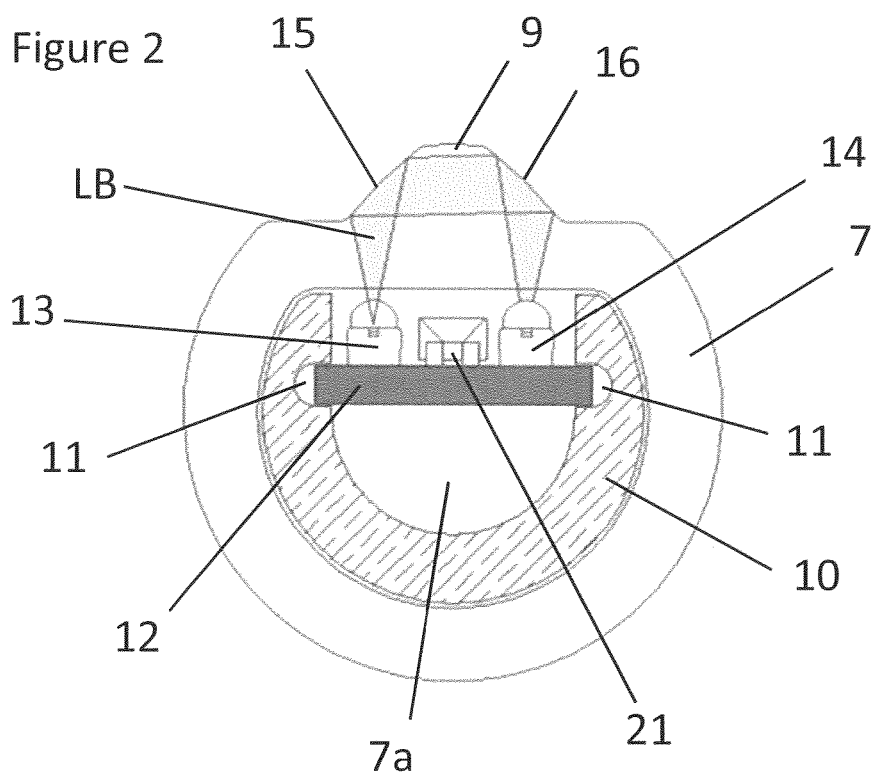
FIG. 2 shows schematically a cross section through the embodiment of FIG. 1.

FIG. 2 shows a cross section of the sensor device at the ring element 7. The ring element 7 is machined out of a plate shaped base element by laser cutting, or any other suitable technique, and comprises a prism element 9 at the outer circumference.

The ring element 7 defines an inner space 7a. In this inner space 7a, a U shaped extension 10 of the housing end part 8 is arranged. This U shaped extension comprises two grooves 11 in which a printed circuit board 12 extends. The printed circuit board 12 supports a light source 13, for example an infrared transmitter, and a light detector 14, for example an infrared receiver.

The light source 13 is configured to emit a light beam LB and the light detector 14 is configured to capture the light beam. The light source 13 and the light detector 14 are surface mounted devices which are mounted by a pick-and-place machine on the printed circuit board 12. All other electronic components, such as processing components to control the light source 13 and light detector 14 are preferably also surface mounted devices mounted on the printed circuit board 12. All components may be mounted by a pick and place machine at a single side of the printed circuit board 12. It is remarked that the location of the light source 13 and the light detector 14 can change places, or be arranged at any other suitable location to cooperate with prism element 9.

The ring element 7 is completely transparent for the light beam LB and is made of plastics material, in particular out of allyl diglycol carbonate also known as CR-39. Any other suitable material that is at least partially transparent for the light beam LB may also be applied.

The light source 13 is configured to emit a light beam LB towards a first outer surface 15 of the prism element 9. When the light beam LB is reflected on the first outer surface 15, the light beam will fall on a second outer surface 16 which may reflect the light beam LB back to the light detector 16.

The incident angles of the light beam LB on the first outer surface 15 and/or the second outer surface 16 are selected such that as a result of the difference between the refractive index of a liquid and the refractive index of air or another gas, the light beam LB may mainly be transmitted when the liquid is present on the first outer surface 15 and/or second outer surface 16 and mainly be reflected when air or another gas is present on the first outer surface 15 and/or second outer surface 16.

Thus, for example, when no liquid is present on the first outer surface 15 and second outer surface 16, the first outer surface 15 and the second outer surface 16 will mainly reflect the light beam LB so that the light beam LB will be received by the light detector 14.

However, when liquid is present on the first outer surface 15 and the second outer surface 16, the light beam LB will mainly be transmitted by the outer surfaces 15, 16 and the light beam will substantially not reach the light detector 14. Thus, the presence of liquid on the outer surfaces 15, 16 can be detected by the light detector 14.

Advantageously, the first outer surface 15 and the second outer surface 16 are curved surfaces. The curvature of the surfaces is selected to converge the diverging light beam LB emitted by the light source 13 to focus the light beam on the light detector after reflection on the outer surfaces 15, 16. This has the result that when no liquid is present on the outer surfaces 15, 16 substantially more light that is emitted by the light source 13 falls on the light detector 14. This makes the sensor device 4 more sensitive and reliable in detecting the presence of liquid on the outer surfaces 15, 16.

The inner space 7a has a non-cylindrical cross section. The cross-section of the extension 10 of the housing end part 8 is shaped to substantially correspond with the inner space 7a so that the extension 10 cannot be rotated within the ring element 7. As the printed circuit board 12 is arranged in the grooves 11, the printed circuit board 12 cannot be rotated with respect to the ring element 7. This fixed position of the printed circuit board 12 with respect to the ring element 10 ensures that the surface mounted light source 13 and light detector 14 remain properly aligned with respect to the outer surfaces 15, 16 of the prism element 9.

Figure 3:
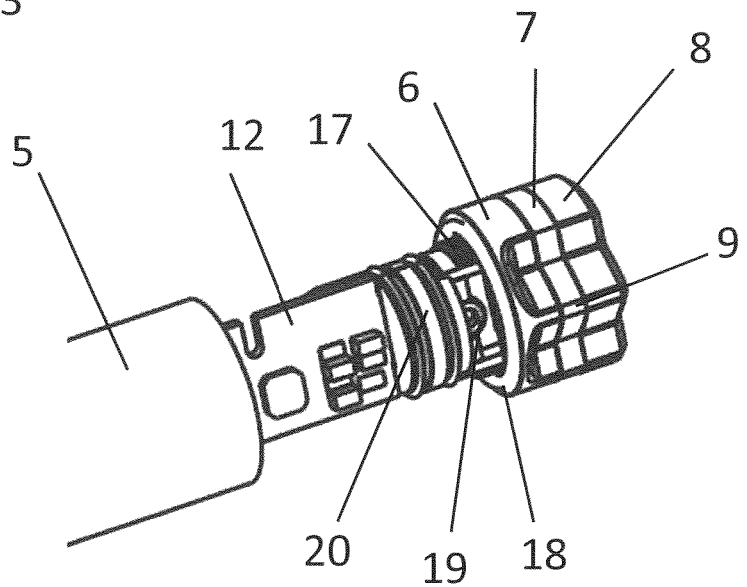
FIG. 3 shows a view on the embodiment of FIG. 1 retracted partially from the cylindrical housing.

FIG. 3 shows a view on the embodiment of FIG. 1 where the cylindrical housing part 5 is translated with respect to the other parts of the sensor device 4. This provides a view on the interior of the sensor device 4.

Figure 4:
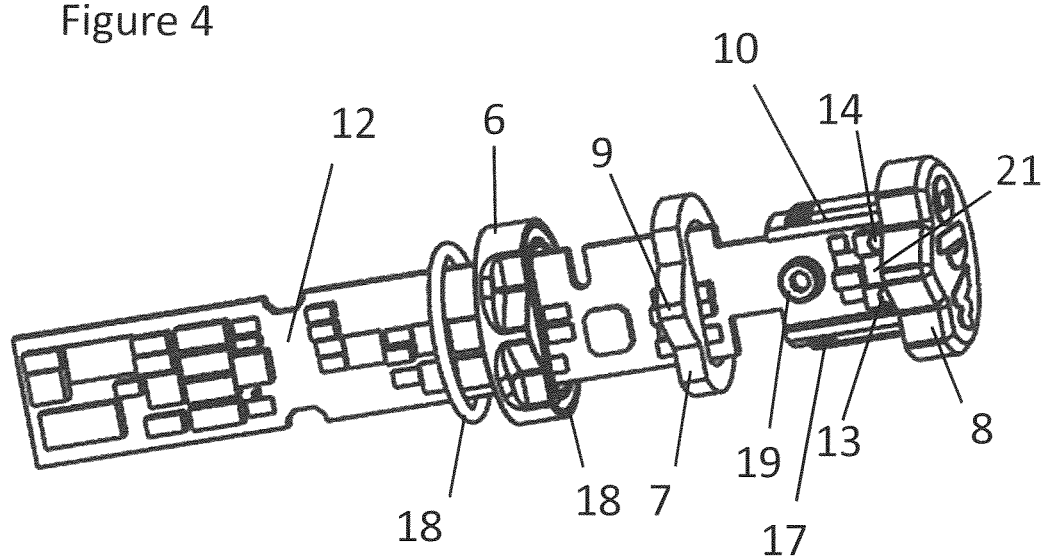
FIG. 4 shows a view on the embodiment of FIG. 1 partly disassembled

FIG. 4 shows a further disassembled view of the sensor device 4. The printed circuit board 12 is completely taken out of the cylindrical housing part 5 and a rubber stop 20 (to be described hereinafter) is removed. The connector ring 6 and the ring element 7 are shifted with respect to the printed circuit board 12. The light source 13 and light detector 14 are visible as the ring element 7 is no longer properly aligned with the light source 13 and the light detector 14.

Figure 5:
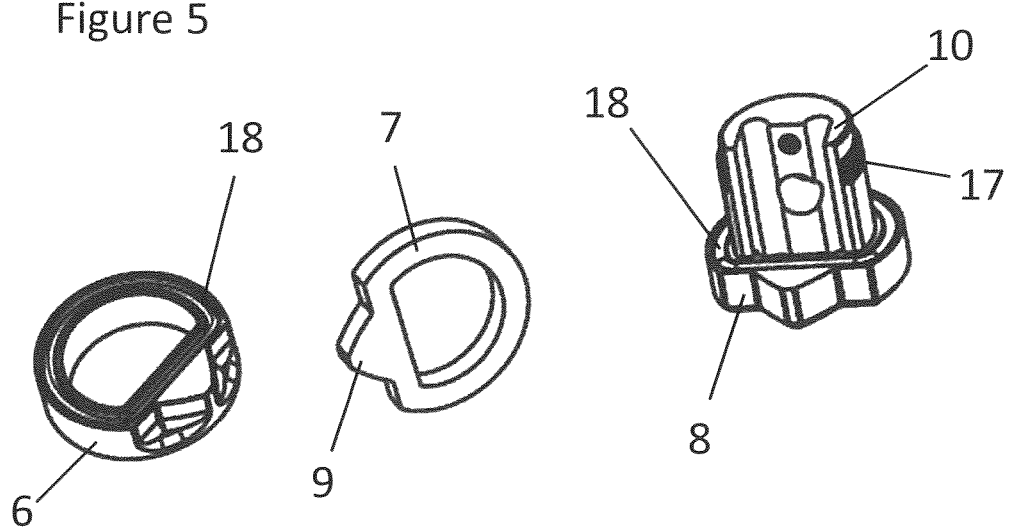
FIG. 5 show a number of disassembled parts of the embodiment of FIG. 1.
Figure 6:
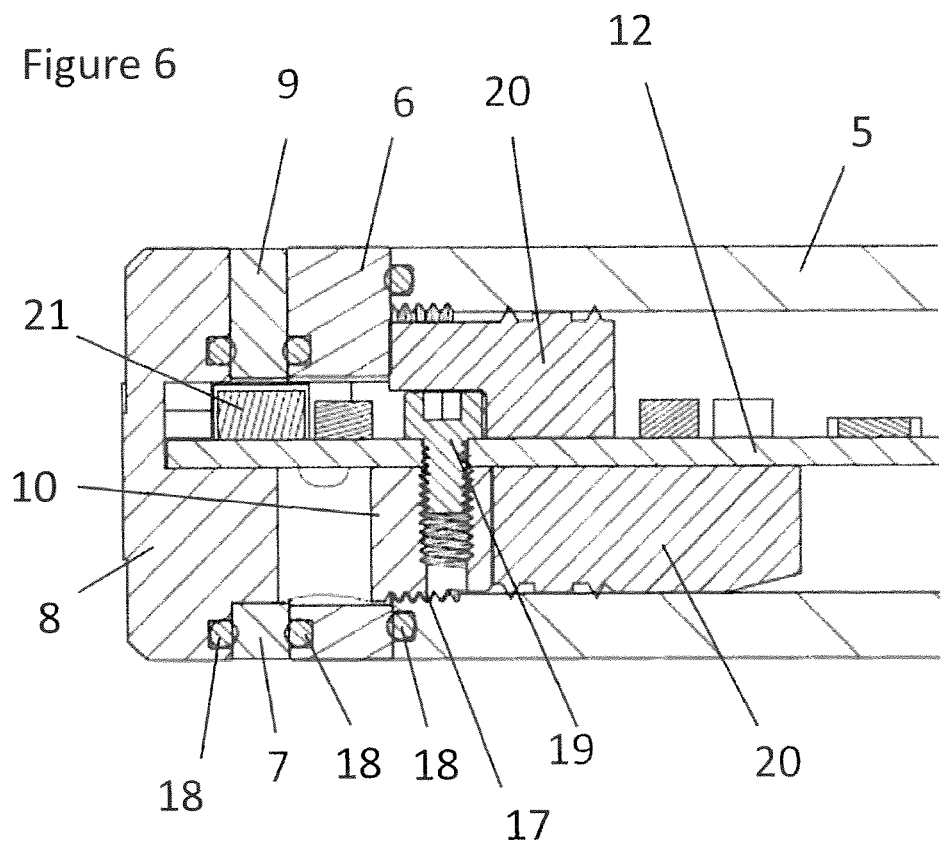
FIG. 6 shows a partial cross-section of the sensor device.

FIG. 5 shows further views on the connector ring 6, the ring element 7 and the housing end part 8, and FIG. 6 shows a cross-section of an end part of the sensor device 4.

The extension 10 of the housing end part 8 is provided with an outer screw thread 17 to cooperate with an inner screw thread of the cylindrical housing part 5. By screwing the cylindrical housing part 5 on the outer screw thread of the extension 10, the connector ring 6 and the ring element 7 can be clamped between the cylindrical housing part 5 and the housing end part 8.

Elastic sealing rings 18, for instance conventional rubber sealing rings, are placed between the cylindrical housing part 5 and the connector ring 6, between the connector ring 6 and the ring element 7, and between the ring element 7 and the housing end part 8 to obtain a sealing connection between these respective parts. The connector ring 6 and the housing end part 8 comprise grooves, formed between rims on the sealing surfaces to receive the sealing rings 18. These grooves ensure that the sealing rings 18 remain at their respective location.

The sealing surfaces of the cylindrical housing part 5, the connector ring 6, and the ring element 7 are substantially planar and parallel to each other. Therefore, a reliable sealing connection between the different parts can be relatively easily be obtained by clamping the connector ring 6 and the ring element 7 between the cylindrical housing part 5 and the housing end part 8. In particular, the sealing surfaces of the ring element 7 are formed by flat parallel surfaces at opposed sides of the ring element 7. In the assembled state, the sealing rings 18 partially held in grooves on the connector ring 6 and the housing end part 8 are clamped in a sealing engagement with these opposed sealing surfaces of the ring element 7. The cylindrical housing part 5 comprises a groove to hold a sealing ring 18 to provide a sealing engagement with the connector ring 6

The connector ring 6 is provided to provide a sealing connection between the cylindrical housing part 5 and the ring element 7 without the need to provide grooves or other means in the ring element 7 to retain the sealing ring 18. In an alternative embodiment a direct sealing engagement between the ring element 7 and the cylindrical housing 5 may be created. The connector ring 6 comprises an inner space substantially the same as the inner space 7a of the ring element 7. As a result, the connector ring is placed in a fixed rotational position with respect to the housing end part 8, when arranged on the extension 10.

The printed circuit board 12 is fixed to the end housing part 8 by a screw element 19. This screw connection further ensures a fixed position of the printed circuit board 12 with respect to the end housing part 8, and therewith a fixed position of the light source 13 and light detector 14 with respect to the prism element 9.

The screw element 19 is a galvanic screw element which provides an electrically conductive connection between the housing end part 8 and the printed circuit board 12. Furthermore, the screw connection between the housing end part 8 and the cylindrical housing part 5 is electrically conductive. Further, there is also an electrically conductive connection between the cylindrical housing part 5 and the sensor support tube 3. As a result of these electrically conductive connections, an additional ground connection to the sensor device 4 is provided. This additional ground connection can for example be connected to a central ground system of a truck on which the sensor device 4 is mounted. This additional ground connection is provided in addition to a standard ground connection of the printed circuit board connecting the printed circuit board by one or a series of ground cables to earth.

The advantage of the additional ground system is that when the ground cable of the standard ground connection is inadvertently disconnected from earth, for example by disconnecting a ground cable connector, the printed circuit board 12 is still connected to earth via the additional ground connection. In this way false readings of the sensor device 4 may be avoided.

Further, rubber stops 20 are provided to avoid that potting material that is being introduced into the cylindrical housing part 5 after assembly of the sensor device 4 reaches the optical elements, such as the light source 13 and the light source 14. Any other material or device to avoid that potting material may reach the optical components may also be applied.

As can be seen in FIGS. 2 and 4, a further light source 21, for example a RGB LED is mounted on the printed circuit board 12 between the light source 13 and the light detector 14. This further light source 21 is configured to provide light signals which are emitted through the ring element 7. The further light signals may be used to indicate a status of the sensor device 4. Different light signals, such as different light colours or different intermittent signal may be used to indicate a different status of the sensor device 4. Such status may include a measurement result, such as liquid/no liquid on the liquid contact surface, an error status, a data transmission status, an initialization status, etc.

Hereinabove, a sensor unit mounted at the top of a compartment of a truck having one or more compartments is described. The sensor device may however also be mounted at any other suitable location. For instance, the sensor device may be used as part of a retain sensor unit mounted at the bottom side of the compartment. Such retain sensor unit can be used to determine whether the compartment is substantially empty, i.e. whether the liquid level of the respective compartment is below the liquid contact surface of the sensor.

The sensor device 4 shown in the drawings comprises a single ring element 7 with associated light source 13 and light detector 14. In an alternative embodiment, the sensor device may comprise two or more at least partially transparent ring elements, wherein the two or more ring elements are spaced with respect to each other, and wherein the two or more ring elements each form a liquid contact surface associated with a light source and a light detector.

Figure 7:
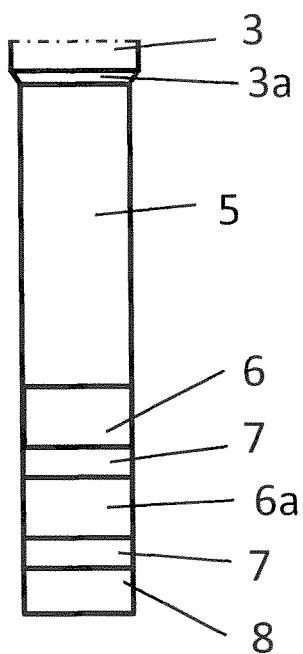
FIG. 7 shows an alternative embodiment of a sensor device.

FIG. 7 shows such alternative embodiment, comprising two ring elements 7, wherein each ring element 7 forms a liquid contact surface associated with a light source and a light detector. A second connector ring 6a is arranged between the two ring elements 7. Sealing rings or other sealing elements are arranged at opposite sides of the ring elements to obtain sealing of the flat planar surfaces of the ring elements 7. The housing end part 8 and the cylindrical housing part 5 are pulled towards each other, for example by a screw thread connection, so that the ring elements 7 and the connector rings 6 are clamped on each other and between the housing end part 8 and the cylindrical housing part 5 to obtain a proper sealing between the different parts. It is remarked that a printed circuit board supporting the light source and the light detector associated with each ring element 7, may extend through both ring elements 7.

A sensor device having multiple ring elements can for example be used to detect the presence of liquid at multiple height levels with a single sensor. Since the ring elements provide an inner space through which cables can be guided, all cabling or other electronic connections to the respective light sources and light detectors can be made through the interior of the sensor device.

The sensor device having multiple transparent ring elements at different levels can for example be used when filling to different heights is desirable. It is also possible to use the multiple transparent ring elements for more controlled filling of the compartment. For example, when it is desired to fill a compartment up to an upper ring, a fast filling mode having a high filling rate may be used to fill up the compartment up to a lower ring. Thereafter the filling mode may be changed to a slower filling mode having a low filling rate, which is lower than the high filling rate, to fill the compartment in a more controlled manner from the lower ring element up to the upper ring element.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. An optical liquid level detection sensor, the sensor comprising:
    a light source for emitting a light beam,
    a liquid contact surface, and
    a light detector,
    wherein the light source is arranged to emit a light beam towards the liquid contact surface, which liquid contact surface reflects or transmits the light beam in dependence of liquid being present on the liquid contact surface,
    wherein the light detector is arranged to receive the light beam after reflection on the liquid contact surface, and
    wherein the sensor comprises an at least partially transparent ring element, wherein the liquid contact surface is formed by an outer surface of the ring element,
    wherein at least a part of the ring element forming the liquid contact surface is formed as a prism element,
    wherein the sensor comprises a housing having two or more housing parts,
    wherein sealing elements are arranged between sealing surfaces of the ring element and the two or more housing parts, and
    wherein the sealing surfaces of the ring elements are formed by opposed planar surfaces of the ring element.

2. The sensor of claim 1, wherein the light source and/or light detector are arranged in the inner space of the ring element.

3. The sensor of claim 1, wherein the prism element has curved surfaces, in particular convex surfaces, to focus light coming from the light source to the light detector.

4. The sensor of claim 1, wherein the ring element is made of glass or plastics material.

5. The sensor of claim 1, wherein the ring element is at least partially made of allyl diglycol carbonate (ADC).

6. The sensor of claim 1, wherein the ring element is completely transparent.

7. The sensor of claim 1, wherein the light source and/or light detector are arranged at a fixed location on a printed circuit board, and wherein the printed circuit board is mounted in a fixed position with respect to the ring element.

8. The sensor of claim 1, wherein the sensor comprises a printed circuit board supporting one or more electronic components including the light source and the light detector, a housing part and a connection element to connect the printed circuit board to the housing part, wherein the connection element is a galvanic connection configured to provide a ground connection between the printed circuit board and the housing part.

9. The sensor of claim 1, wherein the sensor comprises processing components to control the light source and the light detector, and to provide a signal representative for the presence of liquid on the liquid contact surface.

10. The sensor of claim 1, wherein the sensor comprises two or more ring elements spaced with respect to each other, wherein the two or more ring elements each form a liquid contact surface associated with a light source and a light detector.

11. The sensor of claim 1, wherein the sensor comprises one or more further light sources for emitting light signals representative for a status of the sensor.

12. The sensor of claim 11, wherein the light signals comprise light signals with one or more colors and/or light signals emitted during a predetermined time or time interval.

13. The sensor of claim 1, wherein the sensor is configured to be used in a liquid overfill prevention system for liquid fuels.

14. The liquid overfill prevention system of claim 13 in particular configured for flammable liquids, in particular liquid fuels.

15. A liquid overfill prevention system comprising one or more liquid level detection sensors as claimed in claim 1.

* * * * *